United States Patent [19]
Wen

[11] Patent Number: 4,889,354
[45] Date of Patent: Dec. 26, 1989

[54] ECCENTRICALLY OPERATING SPEED-VARIATING MEANS FOR BICYCLE

[76] Inventor: Maz Wen, P.O. Box 89-42, Taipei, Taiwan

[21] Appl. No.: 135,331

[22] Filed: Dec. 21, 1987

[51] Int. Cl.⁴ .............................................. B62M 9/08
[52] U.S. Cl. ...................................... 280/236; 474/50
[58] Field of Search .................. 280/236, 237; 474/50, 474/53

[56] References Cited

U.S. PATENT DOCUMENTS 4,309,043  1/1982  Brown ................................. 280/236
4,598,920  7/1986  Dutil ................................... 280/236

FOREIGN PATENT DOCUMENTS 822080  12/1937  France ................................. 280/236
6767    of 1902  United Kingdom ................ 280/236

Primary Examiner—John A. Pekar

[57] ABSTRACT

A variable speed adjuster for a bicycle includes: a driving disk secured to a bike hub or spokes having a plurality of radial slots formed in the driving disk, a collar secured with a chain wheel driven by a driving chain of a bike pedal having a plurality of sliding blocks slidably engaged in an annular groove formed in the collar each sliding block formed with a sliding roller protruding inwardly to slidably engage each radial slot in the driving disk and an eccentric plate rotatably secured with the collar and fixed on the axle of a bike wheel, wherein the eccentric plate is adjustably biased to allow the collar and the chain wheel to be eccentric to the axle, thereby resulting in a variation of drive ratio of running speed of a bike wheel.

7 Claims, 7 Drawing Sheets

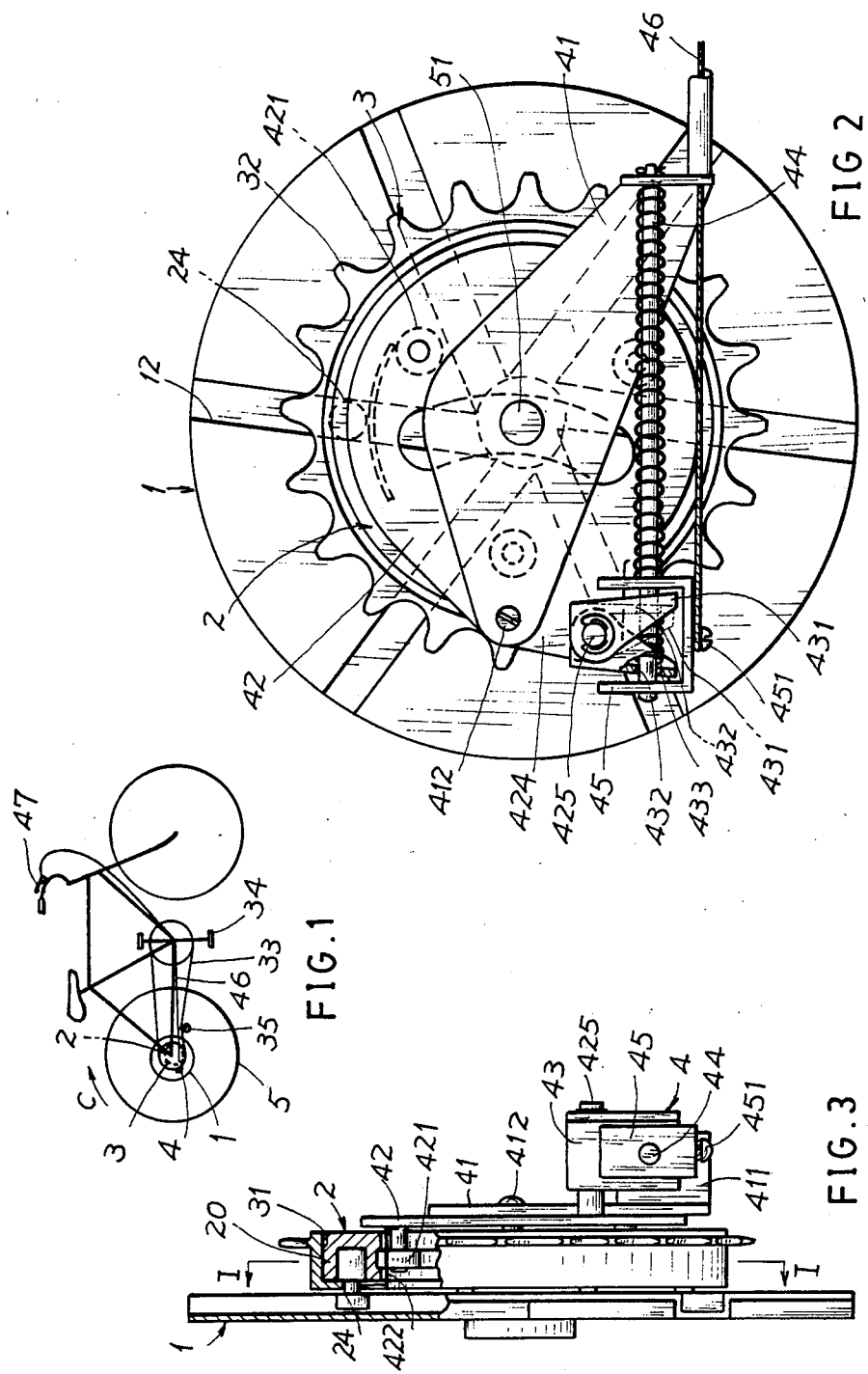

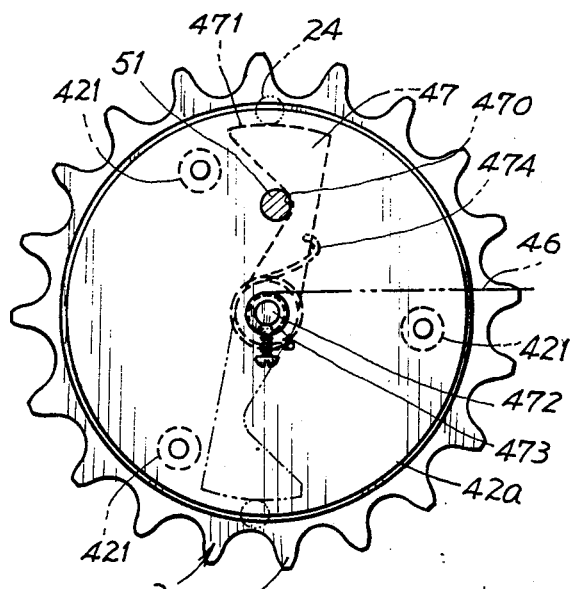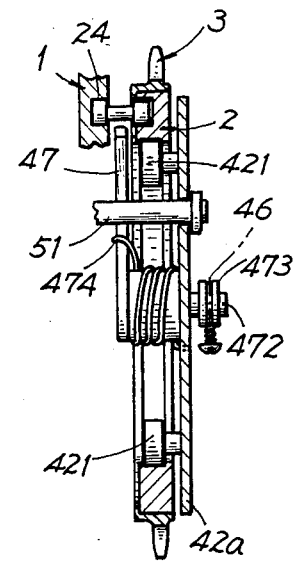
FIG.17    FIG.18
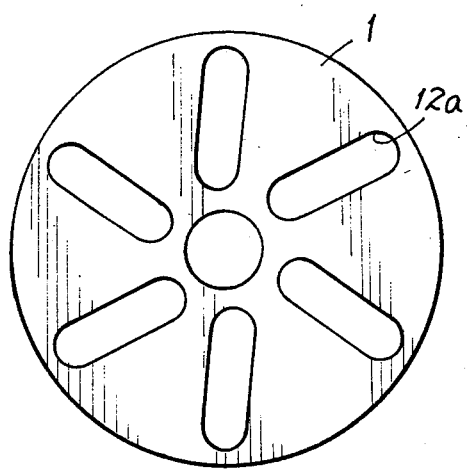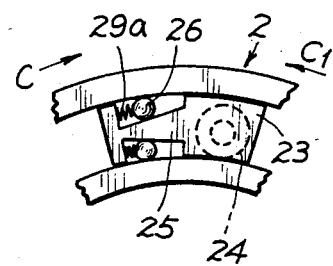
FIG.19    FIG.20

ECCENTRICALLY OPERATING SPEED-VARIATING MEANS FOR BICYCLE

BACKGROUND OF THE INVENTION

A conventional bicycle for variating a driving speed such as for ten variations of speed can not be adjusted to variate its speed when the bike is not running, and the construction thereof is also very complex to cause operation inconvenience.

The present inventor has found the drawbacks of a conventional speed variating means of a bike and invented the present speed-variating means for a bike as eccentrically operated.

SUMMARY OF THE INVENTION

The object of the present invention is to provide a speed variating means for a bicycle including a driving disk secured to a bike hub having a plurality of radial slots formed in the disk, a sliding roller carrier having a plurality of rollers each slidably engageable in each radial slot of the driving disk, a chain wheel secured with the sliding roller carrier and driven by a pedal by means of a chain engageable on the chain wheel and a variable speed adjuster having an eccentric plate rotatably engaged with the sliding roller carrier, in which the eccentric plate can be eccentrically moved around an axle of a bike wheel to adjust a transmission radius of the driving chain around the axle so as to variably adjust the speed of a bike in an easier and simpler way.

BRIEF DESCRIPTION OF THE DRAWINGS

FIG. 1 is an illustration of the present invention as used on a bike.

FIG. 2 is a front elevational view of the present invention.

FIG. 3 is a side view of FIG. 2.

FIG. 17 shows another preferred variable speed adjuster of the present invention.

FIG. 18 is a side-view illustration of the variable speed adjuster of FIG. 17.

DETAILED DESCRIPTION

As shown in FIGS. 1–14, the present invention comprises: a driving disk 1, a sliding roller carrier means 2, a chain wheel 3, and a variable speed adjusting means 4.

Figure 7:
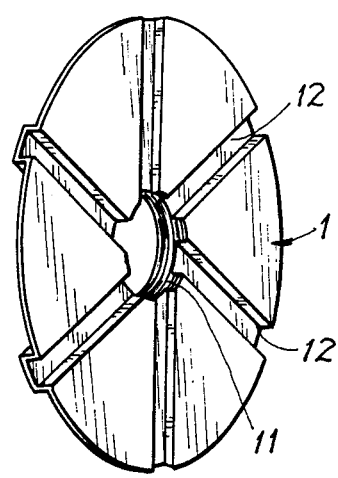
FIG. 7 is an illustration of the driving disk of the present invention.
Figure 8:
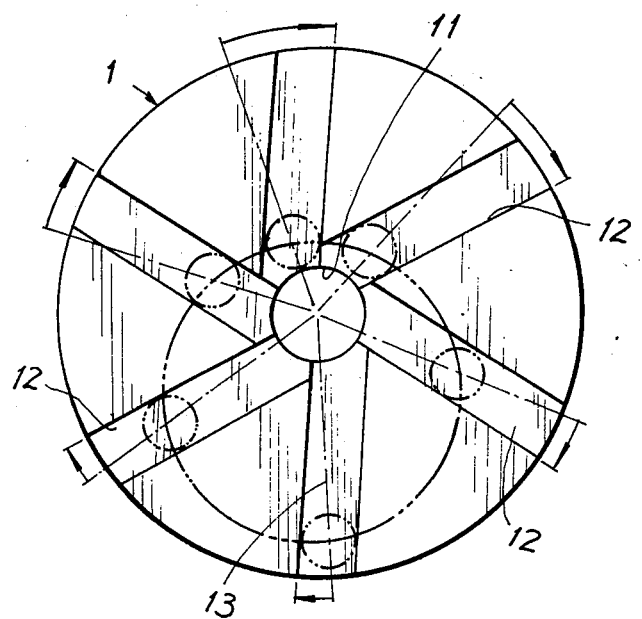
FIG. 8 is a front view of the driving disk of the present invention.

The driving disk 1 as shown in FIGS. 7 and 8 is generally formed as a circular disk having a central hole 11 secured to a bicycle hub (not shown) and formed with a plurality of radial slots 12, each slightly inclined from a corresponding radius 13 of slot 12 to form a approximate spiral shaped as shown in FIG. 8.

Figure 4:
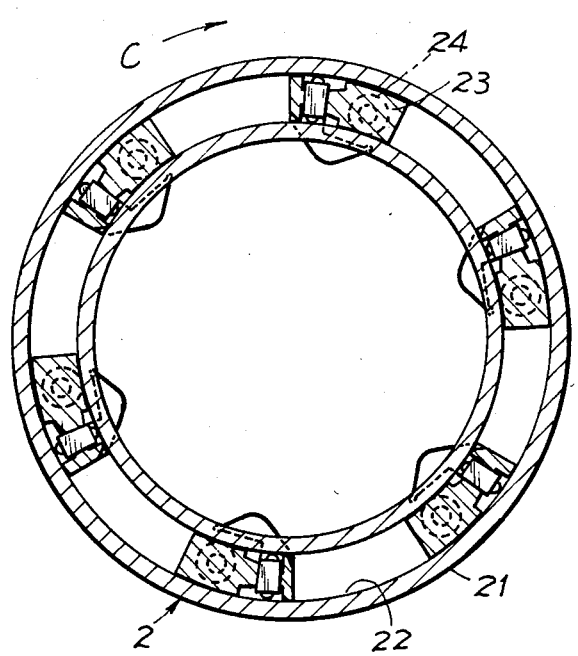
FIG. 4 is a side sectional view of the sliding roller-carrier of the present invention as viewed from I—I directon of FIG. 3.
Figure 5:
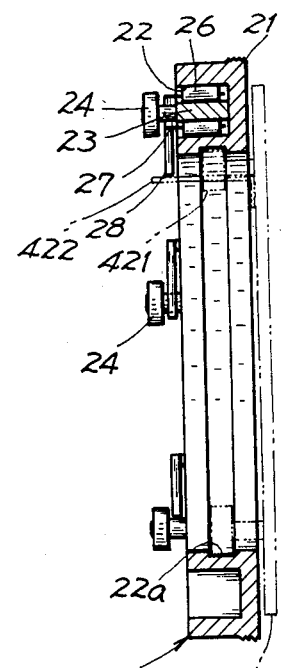
FIG. 5 is a side view of FIG. 4.
Figure 6:
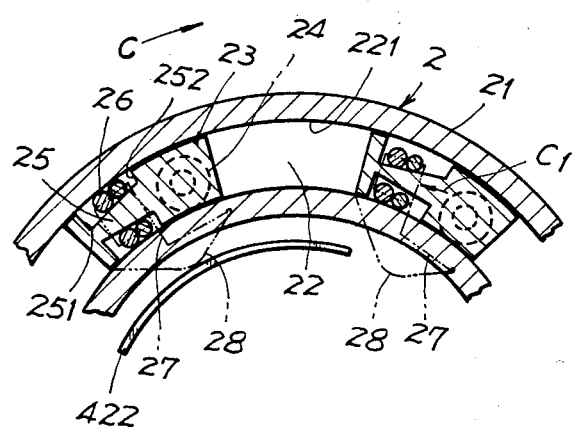
FIG. 6 is a partial enlarged view of the roller carrier of the present invention.
Figure 9:
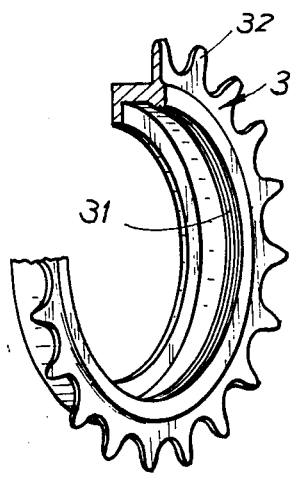
FIG. 9 is an illustration of the chain wheel of the present invention.

The sliding roller carrier means 2 are shown in FIGS. 4–6 is generally formed as a collar having: a male-threaded periphery 21 engaged with a female-threaded annular groove 31 of the chain wheel 3 as shown in FIG. 9, an outer annular groove 22 and an inner annular groove 22a concentric to an axis of the chain wheel 3, a plurality of sliding blocks 23 each block 23 having a sliding roller 24 protruding inwardly to slidably engage each radial slot 12 of the driving disk 1 and each block 23 slidably engaged within the outer annular groove 22 of the carrier means 2, a wedge portion 25 tapered rearwardly or counter-clockwise (if the carrier means is rotated clockwise) to form a pair of acute-angle portions 251 at its tapered side and a pair of obtuse-angle portions 252 at an opposite side proximate to the roller 24, at least a pair of clutching rollers 26, each roller 26 operatively moving between each acute-angle portion 251 and each obtuse-angle portion 252, a supporting frame 27 rataining the rollers 26 on the wedge portion 25 and a tensioning spring 28 normally urging the frame 27 and rollers 26 towards the acute-angle portions 251 as shown in FIG. 6 (direction C1).

Figure 10:
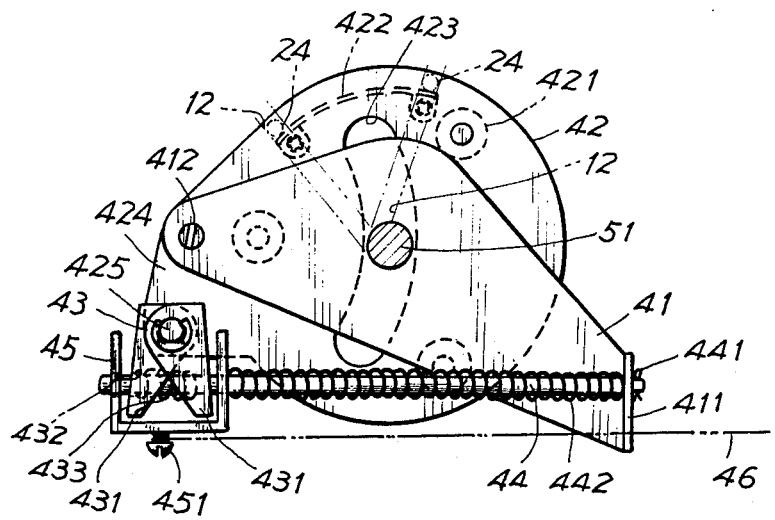
FIG. 10 is a front view of the variable speed adjuster of the present invention.
Figure 11:
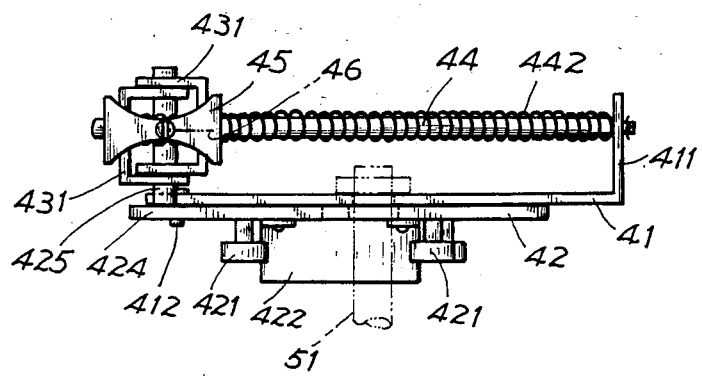
FIG. 11 is a bottom view of FIG. 10.

The variable speed adjusting means 4 as shown in FIGS. 10 and 11 includes: a fixing plate 41 having its central portion secured to an axle 51 of a rear bike wheel 5, an eccentric plate 42 generally made as a circular disk having a plurality of coupling rollers 421 rotatably engaged with the inner annular groove 22a of the roller carrier means 2, an arcuate plate 422 formed on an upper portion of the plate 42 for operatively depressing the spring 28 of the rollers 26, an arcuate slot 423 approximately vertically formed in a central portion of the plate 42 to circumferentially dispose the axle 51 therein around a curvature center which is a fulcrum pin 412 formed on a rear side of the fixing plate 41 for pivotally securing a rear arm portion 424 of the eccentric plate 42 to the fixing plate, a calliper retainer having two calliper arms 431 pivotally mounted on a driving pin 425 formed on a lower end of the rear arm portion 424 of the plate 42 of which each arm 431 is formed with a rod hole 432 passing through a guiding rod 44 secured to a front end bracket 411 of the fixing plate 41 by a retainer pin 441 and resiliently locked on the rod 44 when extended by a calliper tensioning spring 433 tensioned between the two calliper arms 431, a U-shaped pusher member 45 slidably mounted on the rod 44 and normally disposed around the calliper retainer 43 by a positioning spring 442 jacketed on the rod 44 between the pusher member 45 and the front end bracket 411, and an actuating wire 46 having its rear end fixed on the pusher member by a screw 451 and having its front end secured to an operating lever 47 formed on a handle bar of a bike.

Figure 12:
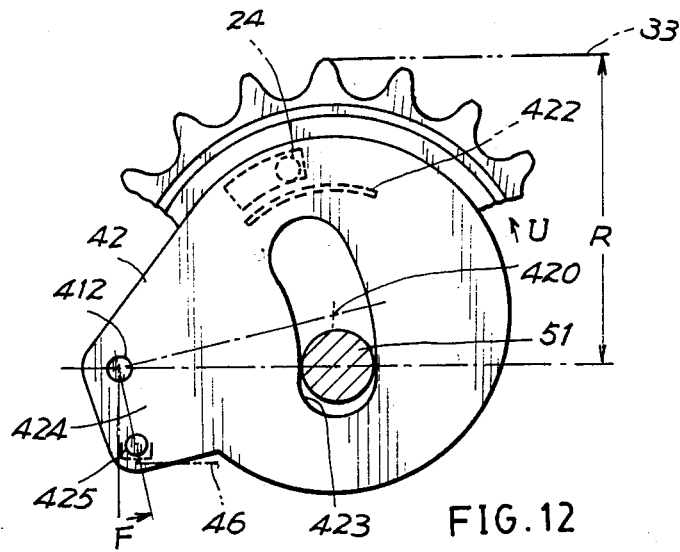
FIG. 12 shows an operation conditon of the eccentric plate of the present invention.

The plural coupling rollers 421 are rotatably engaged with the roller carrier means 2 and chain wheel 3, with the roller axes commonly defining a circle concentric to a center 420 of the circular disk 42. The roller carrier means 2 and the chain wheel 3 are also concentric to the center 420 as shown in FIG. 12. As shown in dotted line of FIG. 10, the arc length of the arcuate plate 422 should be long enough to operatively depress at least one spring 28 of the roller 24 (detailed explanation is described hereinafter) so that when one roller 24 is leaving from one end of the plate 422 another roller 24 will be continuously meeting the opposite end of the plate 422 for continuous forward running of a bike wheel.

When using the present invention for varying a bike speed, a forward pulling (F) of the wire 46 from the driving pin 425 as shown in FIG. 12 will bias the eccentric plate 42 upwardly (U) to allow the arcuate plate 422 to be far away from the axle 51 of the rear wheel 5 and upon a pedal operation to pull the chain 33 to rotate the chain wheel 3 and the roller carrier means 2, the spring 28 as shown in FIG. 6 as moving on the arcuate plate 422 of the eccentric plate 42 will be depressed to forward the clutching rollers frontwardly or clockwise to frictionally urge the side walls 221 of the annular groove 22 to drive the driving disk 1 since the rollers 24 are engaged with the slots 12 of disk 1 and the blocks 23 are frictionally coupled with the carrier means 2 for a clockwise (C) rotation of the bike wheel 5. The transmission radius between the gear teeth 32 at the arcuate plate 422 and the axle 51 is designated to have a larger radius R.

Figure 13:
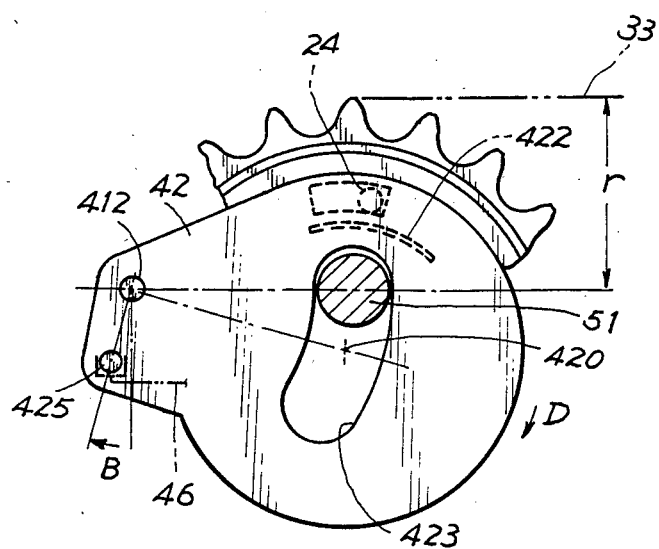
FIG. 13 shows another operation condition of the eccentric plate of the present invention.

However, when retracting the wire 46 backwards (B) as shown in FIG. 13, the eccentric plate 42 will be biased downwardly (D) to shorten the distance between the arcuate plate 422 and the axle 51 so as to reduce the transmission radius r which is smaller than the radius R as shown in FIG. 12 to thereby increase a running speed of a bike with the same pedal stroke L. The above-mentioned radius R or r is described for illustration purpose. Actually, the transmission radius may also be explained between the roller 24 and the axle 51 as shown in FIGS. 12, 13.

When the spring 28 is not urged by the arcuate plate 422 such as the block 23 as shown in a right side of FIG. 6, the spring 28 will tension the clutching rollers 26 rearwardly to release from the contacting with the groove walls 221 so that either a clockwise or a counter-clockwise rotation of the chain wheel 3 and the carrier means 2 will not drive the driving disk 1 and the attached rear wheel 5 since the carrier means 2 is loosely rotated, slidingly separate from the sliding blocks 23.

Figures 14, 15:
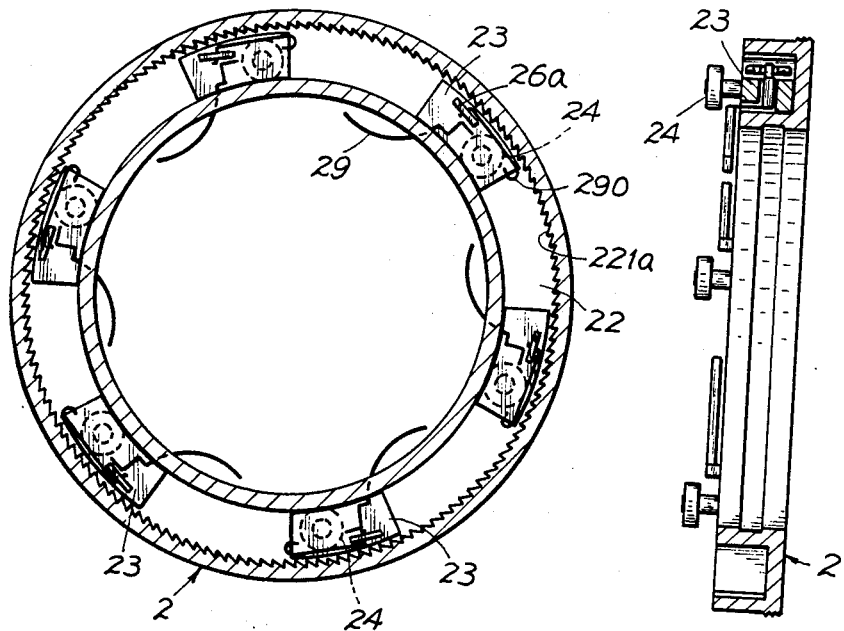
FIG. 14 shows another preferred embodiment of the sliding roller carrier of the present invention.
FIG. 15 is a slide view of FIG. 14.
Figure 16:
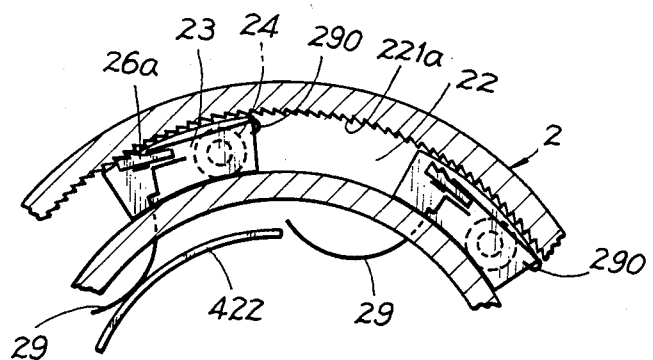
FIG. 16 is a partial illustration of the roller carrier as enlarged from that of FIG. 14.

Another preferred embodiment of the roller carrier means 2 is shown in FIGS. 14-16, in which the aforesaid clutching rollers 26 are modified to be a pawl 26a normally pulled downwardly to release from a ratchet teeth 221a annularly formed in the outer annular groove 22 by a first tensioning spring 290 and operatively engaged with the teeth 221a by a second tensioning spring 29, when depressed by the arcuate plate 422. The second spring 29 will urge the pawl 26a to engage the ratchet teeth so that upon the rotation of the chain wheel 3 and the carrier means 2, the driving disk 1 will be driven as the rollers 24 being engaged with the slots 12 of the driving disk 1. The pawl 26a is normally released from the ratchet teeth 221a as downwardly pulled by a first tensioning spring 290 to separate the transmission between the driving disk 1 and the carrier means 2 for the free rotation of the carrier means either clockwise or counter-clockwise.

For variating the speed, another preferred embodiment of the variable speed adjusting means 4 is modified as shown in FIGS. 17 and 18, in which the variable speed adjusting means 4 includes an eccentric plate made as a circular disk 42a eccentrically mounted on the axle 51 having a plurality of coupling rollers 421 rotatably secured with the carrier means 2, and an eccentric arm member 47 concentrically pivotally secured to the circular disk 42a having an arcuate plate 471 formed on its outermost edge to operatively urge the springs 28 or 29 of the sliding blocks 23 as aforementioned. The eccentric arm member 47 has a central shaft 472 pivotally secured in a center of the disk 42a and has an adjusting wheel 473 protruding outwardly to be operated by an actuating wire 46 wound on the wheel 473. The arm member 27 has a recess portion 470 normally retained on the axle 51 by a restoring spring 474 secured on a central portion of the disk 42a.

Upon a pulling of the wire 46 to rotate the eccentric arm member 47 downwardly as shown in FIG. 17, a transmission radius R is obtained to be larger than the radius r when the arm member 47 is positioned upwardly, thereby adjusting the drive ratio of the bike.

The present invention is simply operated for speed variations just by biasing the eccentric plate eccentrically around an axle to thereby be superior to a conventional speed variating means of a bike. The driving disk 1 may also be secured to the spokes of a bike. Or, the driving disk 1 is integrally made with the bike hub or spokes. For tightening the chain 33, an idler 35 may be provided in this invention.

I claim:

1. A speed variating means for bicycle comprising:
a driving disk secured to a hub or spokes of a bike wheel having a plurality of radial slots formed in said disk;
a sliding roller carrier means having a plurality of sliding blocks slidably formed in an annular groove of said carrier means, each sliding block having a sliding roller protruding inwardly to slidably engage each said radial slot in said driving disk and having a clutching means operatively coupling said sliding block with said carrier means;
a chain wheel secured with said carrier means and driven by a driving chain operated by a bike pedal for driving said carrier means; and
a variable speed adjusting means having an eccentric plate rotatably secured with said carrier means and eccentrically biased with respect to the axle by slidably moving the sliding rollers in said radial slots for adjusting a transmission radius between the driving chain and the axle for variating a bike speed;
said sliding roller carrier means including: a collar secured with the chain wheel having an outer annular groove, a plurality of sliding blocks slidably engaged with said outer annular groove each block having a sliding roller protruding inwardly to slidably engage each said radial slot in said driving disk, and an inner annular groove for rotatably engaging a plurality of coupling rollers formed on said eccentric plate of said variable speed adjusting means, said roller carrier means and said chain wheel being concentric to a center of said eccentric plate;
said sliding block being formed with a wedge portion tapered rearwardly or counter-clockwise if the chain wheel is driven clockwise to form a pair of rear acute-angle portions at a tapered end of the wedge portion and a pair of front obtuse-angle portions at an opposite end of the wedge portion proximate to the sliding roller secured on said sliding block;

the improvement which comprises:

said clutching means including at least a pair of clutching rollers retained on a supporting frame movably held on said wedge portion, and a tensioning spring normally tensioning said clutching rollers rearwardly towards the acute-angle portions to release the clutching rollers from two side walls of the outer annular groove of the roller carrier means, or operatively depressed by an arcuate plate formed on an eccentric plate of said speed adjusting means to urge said clutching rollers frontwardly towards the obtuse-angle portions to frictionally couple said carrier means with said sliding block to forwardly drive said driving disk.

2. A speed variating means for bicycle according to claim 1 wherein each said radial slot in said driving disk is slightly inclined from its corresponding radius of said driving disk to form an approximate spiral shape around a center of the driving disk.

3. A speed variating means for bicycle according to claim 1, the improvement further comprising:

said variable speed adjusting means having a fixing plate secured to an axle of a bike wheel, an eccentric plate generally formed as a circular disk having a rear arm portion pivotally secured to said fixing plate by a fulcrum pin protruding from a rear end of said fixing plate and having an arcuate slot generally vertically formed in said eccentric plate around a curvature center which is aligned with an axis of the fulcrum pin, an arcuate plate formed on an upper portion of said eccentric plate for operatively depressing the clutching means for frictionally coupling said roller carrier means with said sliding block for driving said friving disk, a calliper retainer pivotally connected on a lower end of the rear arm portion protruding rearwardly from said eccentric plate and resiliently locking on a guiding rod protruding rearwardly from a front end bracket formed on a front end of said fixing plate and a pusher member slidably secured on said guiding rod and operatively unlocking said calliper retainer for forwarding or retracting said calliper retainer for biasing said eccentric plate around said fulcurm pin for adjusting a drive ratio of the bike wheel, said axle being disposed in said arcuate slot for eccentrically moving said eccentric plate with respect to said axle.

4. A speed variating means for bicycle according to claim 3, wherein said caliper retainer includes a pair of calliper arms pivotally mounted on a driving pin formed on said eccentric plate, each said calliper arm having a rod hole for passing said guiding rod therethrough.

5. A speed variating means for bicycle according to claim 3, wherein said pusher member includes a U-shaped member disposed about said two calliper arms, as resiliently held on said guiding rod by a positioning spring jacketed on said guiding rod between said pusher member and said front end bracket of said fixing plate.

6. A speed variating means for bicycle according to claim 1, the improvement further comprising:

said variable speed adjusting means having an eccentric plate generally made as a circular disk eccentrically mounted on an axle of a bike wheel, an eccentric arm member having an arcuate plate formed on an outermost edge of said arm member for operatively depressing said clutching means for coupling said sliding block with said roller carrier means and having a central shaft pivotally mounted through a center of said eccentric plate, an adjusting wheel wound with an actuating wire secured on said central shaft, and a restoring spring normally retaining said arm member on said axle, whereby upon a driving of said adjusting wheel to adjustably rotate said arm member around said center of said eccentric plate, a transmission radius between said arcuate plate and said axle is varied.

7. A speed variating means for bicycle comprising:

a driving disk secured to a hub or spokes of a bike wheel having a plurality of radial slots formed in said disk;

a sliding roller carrier means having a plurality of sliding blocks slidably formed in an annular groove of said carrier means, each sliding block having a sliding roller protruding inwardly to slidably engage each said radial slot in said driving disk and having a clutching means operatively coupling said sliding block with said carrier means:

a chain wheel secured with said carrier means and driven by a driving chain operated by a bike pedal for driving said carrier means; and a variable speed adjusting means having an eccentric plate rotatably secured with said carrier means and eccentrically biased with respect to the axle by slidably moving the sliding rollers in said radial slots for adjusting a transmission radius between the driving chain and the axle for variating a bike speed;

said sliding roller carrier means including: a collar secured with the chain wheel having an outer annular groove, a plurality of sliding blocks slidably engaged with said outer annular groove each block having a sliding roller protruding inwardly to slidably engage each said radial solt in said driving disk, and an inner annular groove for rotatably engaging a plurality of coupling rollers formed on said eccentric plate of said variable speed adjusting means, said roller carrier means and said chain wheel being concentric to a center of said eccentric plate;

said sliding roller carrier means including a collar having an outer annular groove formed with an annular ratchet teeth in a side wall of said outer annular groove, a plurality of sliding blocks slidably engaged in the outer annular groove of said collar each block having a sliding roller protruding inwardly to slidably engage each said radial slot in said driving disk:

the improvement which comprises:

said clutching means including a pawl normally released from said annular ratchet teeth as downwardly pulled by a first tensioning annular ratchet teeth as downwardly pulled by a first tensioning spring, or operatively engaged with the annular ratchet teeth for coupling said carrier means with said sliding block as urged by a second tensioning spring when depressed by an arcuate plate formed on said eccentric plate of said variable speed adjusting means.

* * * * *